(12) United States Patent
Schlueter

(10) Patent No.: US 11,117,644 B2
(45) Date of Patent: Sep. 14, 2021

(54) AIRCRAFT AND METHOD FOR PRODUCING AN AIRCRAFT

(71) Applicant: Airbus Defence and Space GmbH, Taufkirchen (DE)

(72) Inventor: Ralf Schlueter, Riemerling (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 318 days.

(21) Appl. No.: 16/200,345

(22) Filed: Nov. 26, 2018

(65) Prior Publication Data

US 2019/0193829 A1 Jun. 27, 2019

(30) Foreign Application Priority Data

Dec. 21, 2017 (DE) .......................... 102017130884.9

(51) Int. Cl.
 *B64C 1/06* (2006.01)
 *B29C 64/00* (2017.01)
 (Continued)

(52) U.S. Cl.
 CPC ................ *B64C 1/06* (2013.01); *B22F 7/062* (2013.01); *B22F 10/10* (2021.01); *B29C 64/00* (2017.08); *B33Y 80/00* (2014.12); *B64C 1/00* (2013.01); *B64F 5/10* (2017.01); *B33Y 10/00* (2014.12); *B64C 2001/0081* (2013.01)

(58) Field of Classification Search
 CPC ........................................................ B22F 7/02
 See application file for complete search history.

(56) References Cited

U.S. PATENT DOCUMENTS 5,167,387 A * 12/1992 Hartwich .............. B64C 21/025
 244/200
6,119,978 A * 9/2000 Kobayashi ........... B21D 26/055
 244/134 R
(Continued)

FOREIGN PATENT DOCUMENTS

DE 102014103438 A1 1/2015
DE 102016210079 A1 12/2017
(Continued)

OTHER PUBLICATIONS

European Search Report for Application No. 18205860.2 dated May 7, 2019.
(Continued)

*Primary Examiner* — Jacob J Cigna
(74) *Attorney, Agent, or Firm* — Jenkins, Wilson, Taylor & Hunt, P.A.

(57) ABSTRACT

The present disclosure relates to an aircraft. The aircraft has a primary structural element, which extends along a main axis of the aircraft, and at least one monolithic structural component, which is produced by a three-dimensional printing method. The aircraft also has an aircraft system for carrying out an aircraft-specific function. The at least one monolithic structural component is fixed on the primary structural element by a fixing device, system, means, or mechanism. The monolithic structural component is embodied to accommodate the aircraft system. The disclosure also relates to a method for producing an aircraft.

19 Claims, 3 Drawing Sheets

(51) Int. Cl.
  *B22F 7/06*    (2006.01)
  *B22F 10/10*   (2021.01)
  *B33Y 80/00*   (2015.01)
  *B64F 5/10*    (2017.01)
  *B64C 1/00*    (2006.01)
  *B33Y 10/00*   (2015.01)

(56) References Cited

U.S. PATENT DOCUMENTS

| | | | | |
|---|---|---|---|---|
| 2005/0044712 A1* | 3/2005 | Gideon | ............ | B60R 13/0815 29/897.32 |
| 2008/0243455 A1 | 10/2008 | Wood | | |
| 2011/0311389 A1 | 12/2011 | Ryan et al. | | |
| 2012/0132755 A1* | 5/2012 | Petit | ............ | F16L 5/12 244/131 |
| 2015/0004348 A1* | 1/2015 | Zuardy | ............ | B64G 1/22 428/76 |
| 2015/0291283 A1* | 10/2015 | Lyons | ............ | B29C 64/129 428/131 |
| 2015/0298213 A1* | 10/2015 | Beyer | ............ | F02K 9/97 419/7 |
| 2016/0159464 A1* | 6/2016 | Alderman | ............ | B64C 21/06 244/209 |
| 2018/0118324 A1* | 5/2018 | Tyler | ............ | B32B 7/08 |
| 2019/0032491 A1* | 1/2019 | Nissen | ............ | B22F 10/20 |
| 2019/0217536 A1* | 7/2019 | Honorato Ruiz | ............ | B33Y 80/00 |
| 2019/0374868 A1* | 12/2019 | Russell | ............ | A63H 33/062 |
| 2020/0207024 A1* | 7/2020 | Morris | ............ | G06F 30/20 |
| 2020/0247561 A1* | 8/2020 | Rivera | ............ | B22F 5/04 |

FOREIGN PATENT DOCUMENTS

| | | | | |
|---|---|---|---|---|
| DE | 102016210089 A1 | 12/2017 | | |
| EP | 1323631 A1 | 7/2003 | | |
| EP | 2813432 A1 | 12/2014 | | |
| EP | 2839905 A1 | 2/2015 | | |
| EP | 2876044 A1 | 5/2015 | | |
| EP | 3 031 713 A1 | 6/2016 | | |
| EP | 3210757 A1 | 8/2017 | | |
| GB | 2567445 A * | 4/2019 | ............ | B64C 23/065 |

OTHER PUBLICATIONS

European Office Action for Application No. 18205860.2 dated Feb. 12, 2020.

European Office Action for Application No. 18205860.2 dated Sep. 25, 2020.

* cited by examiner

AIRCRAFT AND METHOD FOR PRODUCING AN AIRCRAFT

CROSS-REFERENCE TO PRIORITY APPLICATION

This application claims the benefit of, and priority to, German patent application number DE 10 2017 130 884.9, filed on Dec. 21, 2017. The content of the referenced application is incorporated by reference herein.

TECHNICAL FIELD

Embodiments of the subject matter described herein relate generally to the printing of three-dimensional geometries in the aviation industry. In particular, the disclosure relates to an aircraft and to a method for producing an aircraft.

BACKGROUND

Nowadays, aircraft, in particular airplanes, are produced from a multiplicity of individual parts. In some cases, the production of these individual parts is associated with relatively high production outlay since they generally involve complex geometries. For example, formers and stringers are produced as individual parts and then connected individually to outer skin regions of the airplane. Moreover, countless fixing means, e.g. rivets, pins and screws, are used for this purpose. In addition to increased production outlay, this has a considerable effect on the overall weight of the airplane. Moreover, aircraft systems, such as electric leads, hydraulic lines or actuators, are additionally mounted on the already present structural elements, further increasing the number of components to be installed.

Patent publication DE 10 2016 210 079 A1 describes a method for producing a fuselage portion, in particular for an aircraft or spacecraft. Here, a skin portion which comprises a thermoplastic material is welded to a former containing a thermoplastic in the region of a predetermined welding zone. Furthermore, a fixing element designed as a crack stopper is connected to the skin portion and to the former in the region of the welding zone.

Patent publication DE 10 2016 210 089 A1 describes a method for connecting skin portions of a closed fuselage, in particular for an aircraft or spacecraft. In this case, at least one first skin portion and one second skin portion are provided, wherein the first skin portion and the second skin portion are positioned in such a way relative to one another for a first joint that the skin portions form a fuselage assembly which is continuous in the circumferential direction. Moreover, a first joining head is guided along the first joint on an outer surface of the fuselage assembly, and a second joining head is guided along the first joint on an inner surface of the fuselage assembly, wherein the second joining head is guided along longitudinal guidance means which are arranged within the circumferentially continuous fuselage assembly and are formed at least partially by the components to be installed in the fuselage.

BRIEF SUMMARY

It is an object of the disclosure to reduce the production outlay for the production of an aircraft.

This object is achieved by the subjects of the independent claims. Illustrative embodiments can be found in the dependent claims and the following description.

According to one aspect of the disclosure, an aircraft, in particular an airplane, is specified. The aircraft has a primary structural element, which extends along a main axis of the aircraft. Moreover, the aircraft has at least one monolithic structural component, which is produced by means of a three-dimensional printing method. The aircraft furthermore has an aircraft system for carrying out an aircraft-specific function. The at least one monolithic structural component is fixed on the primary structural element by a fixing means. The monolithic structural component is embodied to accommodate the aircraft system.

By means of an aircraft of this kind, the production outlay for the production of the aircraft can be considerably reduced since fewer individual parts are required in assembling components. In particular, the only primary structural elements which are provided are those to which monolithic structural components can then be attached or printed by means of a three-dimensional printing method (3-D printing method or simply 3-D printing). This means that installation spaces which accommodate the aircraft systems required at a particular point in the aircraft are created by the monolithic structural components, thus making it possible to provide the required functions at the corresponding points in the aircraft.

In other words, airplane structures are produced in such a way that monolithic installation space geometries, i.e. monolithic structural components, which are produced by 3-D printing, i.e. by "laser additive manufacturing", and are suitable, on the one hand, for absorbing and transmitting forces and also, on the other hand, for performing installation-space-specific technical tasks, i.e. aircraft-specific functions, are positioned between the primary structural elements which absorb principal forces, such as spar and keel structures. Such installation-space-specific technical tasks are, for example, aerodynamic functions at the corresponding points of the aircraft, equipment and transmission tasks, transmission functions for electric and/or hydraulic energy and data or the storage of fuel in integral tanks.

Here, a three-dimensional printing method can be understood to mean a 3-D printing method such as "additive layer manufacturing" (ALM), in which a finished product is produced by means of laser technology and powdered material.

A primary structural element is, for example, a main beam element, e.g. a longitudinal beam element or a keel beam or a crossbeam element or a spar of the aircraft. The primary structural element is embodied to absorb and transmit principal forces within the aircraft during operation. The primary structural element extends along a main axis, that is to say in a main axis direction, of the aircraft. In this context, the main axis can be a longitudinal axis, which extends in the longitudinal direction of the aircraft fuselage, or a transverse axis, which extends substantially parallel to a wing structure of the aircraft. This is explained in greater detail in the description of the figures. However, primary structural elements which extend in a direction which differs from the directions of extent mentioned are also possible.

One or more monolithic structural components, that is to say monolithic structural blocks, are fixed on this primary structural element. In this context, the term "monolithic" can be understood to mean that these are one-piece structural components or structural components produced from a single block or a single piece. In terms of its structure, the monolithic structural component has a uniform structure over its entire extent, for example. However, different compositions of material are possible within the monolithic structural component.

The monolithic structural component can be a solid or a porous component, for example. The monolithic structural component has, for example, a sponge-type structure which is produced on the basis of bionic structures by means of 3-D printing. In this way, it is also possible to produce components with undercuts, e.g. containers or tanks with baffles, in a simple manner, and these can be fixed directly or indirectly on the primary structural element of the aircraft. The monolithic structural component or monolithic structural components can be fixed on the primary structural element by positive engagement, for example, in particular by printing the monolithic structural component directly on the primary structural element by means of 3-D printing. However, it is also possible for the fixing means to be provided by separate components, such as screwed, riveted or bolted joints.

The monolithic structural component can have a cross section in the form of a wing profile or of a part of a wing profile if the monolithic structural component represents an installation space for a wing component of the aircraft. Furthermore, the monolithic structural component can at least partially have the shape of a hollow cylinder if the monolithic structural component represents an installation space for a fuselage component, in particular an outer skin component, of the aircraft.

The aircraft furthermore has an aircraft system which serves for carrying out an aircraft-specific function. In this context, the aircraft system can be integrated into the monolithic structural component or embedded therein. This means that the monolithic structural component has cavities or openings into which the aircraft system is received. For example, the aircraft system can be completely or at least partially surrounded by the monolithic structural component. In this way, it is possible to position the corresponding aircraft system while the monolithic structural component is being produced or printed, considerably reducing the subsequent assembly effort since there is no longer a need for additional fixings for the aircraft system on the monolithic structural component.

The aircraft system can be a control unit, such as an actuator or a drive for controlling control surfaces of the aircraft. Furthermore, the aircraft system can also be a lead for supplying such control units with electric energy, hydraulic energy or data, the monolithic structural component into which such leads or control units are integrated thus representing an installation space for a corresponding function, that is to say a control function or a transmission function. Thus, the monolithic structural component therefore acts as an installation space for many different types of aircraft system, thus making it possible to provide certain aircraft-specific functions in the installation space, that is to say at the point at which the monolithic structural component is situated in the aircraft. Such a function can also merely provide lift for the aircraft through the shape of the monolithic structural component itself, e.g. in the wing region of the aircraft. Furthermore, such a function can provide fuel when, for example, a fuel tank is integrated as an aircraft system into the monolithic structural component.

According to one embodiment of the invention, the aircraft has a plurality of monolithic structural components, wherein each monolithic structural component of the plurality of monolithic structural components is produced by means of a three-dimensional printing method. In this case, the monolithic structural components are arranged adjacent to one another along the main axis of the aircraft and fixed on the primary structural element in order in this way to form a basic structure of the aircraft.

For example, the plurality of monolithic structural components forms a fuselage structure of the aircraft or a wing structure of the aircraft. This is explained in greater detail in the description of the figures.

Thus, the basic structure of the aircraft can be formed either by a single monolithic structural component which already has a predetermined shape and different receptacles for aircraft systems or, alternatively, from a plurality of monolithic structural components which, as a whole, form the basic structure of the aircraft and wherein each individual monolithic structural component of the plurality of monolithic structural components has a specific shape and has receptacles for corresponding aircraft systems. For example, a first monolithic structural component has an actuator for controlling a control surface of the aircraft and another monolithic structural component has a fuel tank, wherein the two monolithic structural components can be arranged next to one another, that is to say adjacent to one another. This is the case, for example, when the two monolithic structural components form part of a wing structure of the aircraft.

The individual monolithic structural components of the plurality of monolithic structural components can be fixed to one another and can also comprise different materials. It is possible for a first monolithic structural component to be printed onto a second, using different materials for the two structural components during the 3-D printing process, for example.

According to another embodiment of the invention, the at least one monolithic structural component has a porous structure.

In this case, the monolithic structural component can have a bionic structure in the form of a sponge structure, thereby making it possible to reduce the overall weight of the aircraft while nevertheless ensuring the required strength properties of the basic structure of the aircraft.

In this case, the porous structure can be in the form of a multiplicity of cells or cavities in the monolithic structural component with or without cells that are open at the surface. In particular, the monolithic structural component can have a porous or sponge-type structure on the inside and have an aerodynamically smooth surface at the surface, e.g. where the monolithic structural component forms an outer skin region of the aircraft fuselage. It is thus possible for the monolithic structural component to provide both stability functions while simultaneously saving weight by means of the porous internal structure and aerodynamic functions by virtue of the aerodynamically smooth surface. In any case, both components, that is to say the porous internal structure and the aerodynamically smooth surface, can be produced in one piece in a single structural component by means of 3-D printing, i.e. monolithically, on the aircraft according to the disclosure. In this way, a multiplicity of monolithic structural components can be fixed on the primary structural element in order in this way to form the basic structure of the aircraft.

According to another embodiment of the invention, the primary structural element has a spar of a wing structure of the aircraft. In addition or as an alternative, the primary structural element can have a keel beam of a fuselage structure of the aircraft.

The spar can extend perpendicularly to the keel beam or perpendicularly to a longitudinal beam of the aircraft. The spar and the keel beam are therefore preferably designed as a cross joint assembly. In this case, the spar extends substantially transversely to the incident flow direction of the aircraft during flight, wherein the keel beam extends substantially parallel to the incident flow direction. A multiplicity of monolithic structural components can then be attached to the spar and/or to the keel beam in each case, together forming the basic structure of the aircraft. In this case, for example, a plurality of monolithic structural components fixed on the spar jointly form the wing structure of the aircraft, and a plurality of monolithic structural components fixed on the keel beam jointly form the fuselage structure of the aircraft. Here, the monolithic structural components of the fuselage structure preferably have a hollow cylindrical shape in order in this way to form a freight zone or a passenger cabin of the aircraft, whereas the monolithic structural components of the wing structure have a wing profile shape, which can be of at least partially hollow design or can be compact. In both cases, the material of the monolithic structural components can have a porous or a compact structure.

According to another embodiment of the invention, the aircraft system is a system from a group comprising an electric lead, a hydraulic line, a control cable, a control unit and a tank.

The aircraft system can thus be understood as a kind of component system or subsystem of the aircraft which is of significance for various functions of the aircraft. The aircraft systems are accommodated in the monolithic structural component, that is to say embedded in said component and/or fixed thereon. It is possible for a single aircraft system to be accommodated by two or more monolithic structural components. For example, an electric lead or hydraulic line or a control cable extends through several monolithic structural components. It is also possible for the aircraft system to be at least partially surrounded by one or more monolithic structural components or to be accommodated in an undercut or in a cavity of the monolithic structural component. In particular, a fuel or drinking water tank can be provided as a cavity in the monolithic structural component. In this case, baffles or other geometries can be formed in the cavity of the monolithic structural component since the monolithic structural component is produced by means of 3-D printing and thus allows any desired geometries.

According to another embodiment of the invention, the aircraft system is embedded in the monolithic structural component.

The aircraft system can therefore be integrated or incorporated directly into the monolithic structural component by means of the 3-D printing process. This is the case, for example, with the direct printing of a monolithic structural component with a tank cavity and corresponding connection ducts. Here, the required cavities and ducts can be allowed for directly during the 3-D printing of the monolithic structural component. An outer surface of the monolithic structural component can, in turn, have an aerodynamic wing profile. This can be a monolithic structural component of the wing structure.

According to another embodiment of the invention, a fixing device, element, system, or mechanism has a force-fit joint, a form-fit joint, or a material joint for fixing the monolithic structural component on the primary structural element.

In this context, a material joint can comprise welded joints, adhesive joints or brazed joints. Furthermore, the monolithic structural component can be printed directly onto the primary structural element or imprinted thereon by 3-D printing. It is possible for the material joint between the primary structural element and the monolithic structural component to have an abrupt or a continuous transition in the material composition or, alternatively, for both elements to have the same material composition.

Moreover, press-fitting or clamped joints are possible. A screwed joint, a riveted joint, a bolted joint or a pin joint are likewise possible as fixing elements. A combination of the types of joint mentioned can also be considered for fixing the monolithic structural component or the multiplicity of monolithic structural components on the primary structural element.

According to another embodiment of the invention, the at least one monolithic structural component is produced from a metallic alloy.

In this case, high-strength titanium and nickel materials and alloys containing such materials but also weight-reducing aluminum alloys are preferred candidates for consideration. It is also possible for the monolithic structural component to be produced from a plastic. All the materials or material combinations mentioned can therefore be used for 3-D printing in order in this way to produce the monolithic structural component. It is possible for the material of a monolithic structural component of the multiplicity of monolithic structural components to be varied depending on the mounting point or mounting location on the primary structural element. Thus, it is possible for, preferably strong, titanium alloys to be used for the monolithic structural components to be installed at the root of the wings of the aircraft, wherein monolithic structural components made from alloys with a higher aluminum content are provided at the ends of the wings as the load decreases.

According to another embodiment of the invention, the composition of the metallic alloy of the at least one monolithic structural component changes along the primary structural element.

It is possible for the composition to be adapted continuously or at a certain time intervals during the 3-D printing process, thus making it possible to provide monolithic structural components with a predetermined material distribution. Thus, the aluminum content of a monolithic structural component can increase in the direction of the end of the wings with increasing distance from the root of the wings in order in this way to save weight. Here, the material composition can be dependent on the strength requirements and weight requirements within various regions of a monolithic structural component.

According to one aspect, a method for producing an aircraft is specified. In one step of the method, an elongate primary structural element extending along a main axis of the aircraft is provided. In a further step, three-dimensional printing of at least one monolithic structural component is carried out. In a further step, an aircraft system for carrying out an aircraft-specific function is provided. In a further step, the at least one monolithic structural component is fixed on the primary structural element. In a further step, the aircraft system is integrated into a receiving region of the at least one monolithic structural component. Here, the steps mentioned can be carried out in the sequence described.

According to one embodiment of the invention, in a further step the aircraft system is integrated into the receiving region of the at least one monolithic structural component during the three-dimensional printing of the monolithic structural component. This enables the aircraft system to be embedded directly into the monolithic structural component during the 3-D printing process. For example, ducts for electric leads or hydraulic lines or control cables can be left free during the 3-D printing of the monolithic structural component, thus enabling such systems to be arranged in the monolithic structural component during the printing process itself.

The method according to the disclosure and/or the aircraft according to the disclosure is based on the provision of a basic design of an aircraft, in particular of an airplane. In this case, the spar and keel structures (main spars for the wing and tail assembly) absorbing the principal forces as well as simple or dual fuselage keel structures are initially designed as cross-joint assemblies. Instead of producing the additional installation spaces, such as cabins etc., by means of formers and stringers, and then providing receiving points for equipment and lines (electric leads and fuel or hydraulic lines or mechanical control cables), and subsequently installing aerodynamically acting outer and inner skins of the aircraft, a monolithic structure is now designed and produced by means of 3-D printing to perform the specified functions at the corresponding installation point.

It is thereby ideally possible to reduce the number of parts to one per installation space, that is to say one per monolithic structural component. In particular, the complexity of production and complexity of assembly can be considerably reduced by the aircraft according to the disclosure and the method according to the disclosure. Apart from this reduction in complexity, a reduction in weight is achieved.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The illustrations in the figures are schematic and not to scale.

Where the same reference signs are used in various figures in the following description of the figures, they denote identical or similar elements. However, identical or similar elements may also be denoted by different reference signs.

Figure 1A:
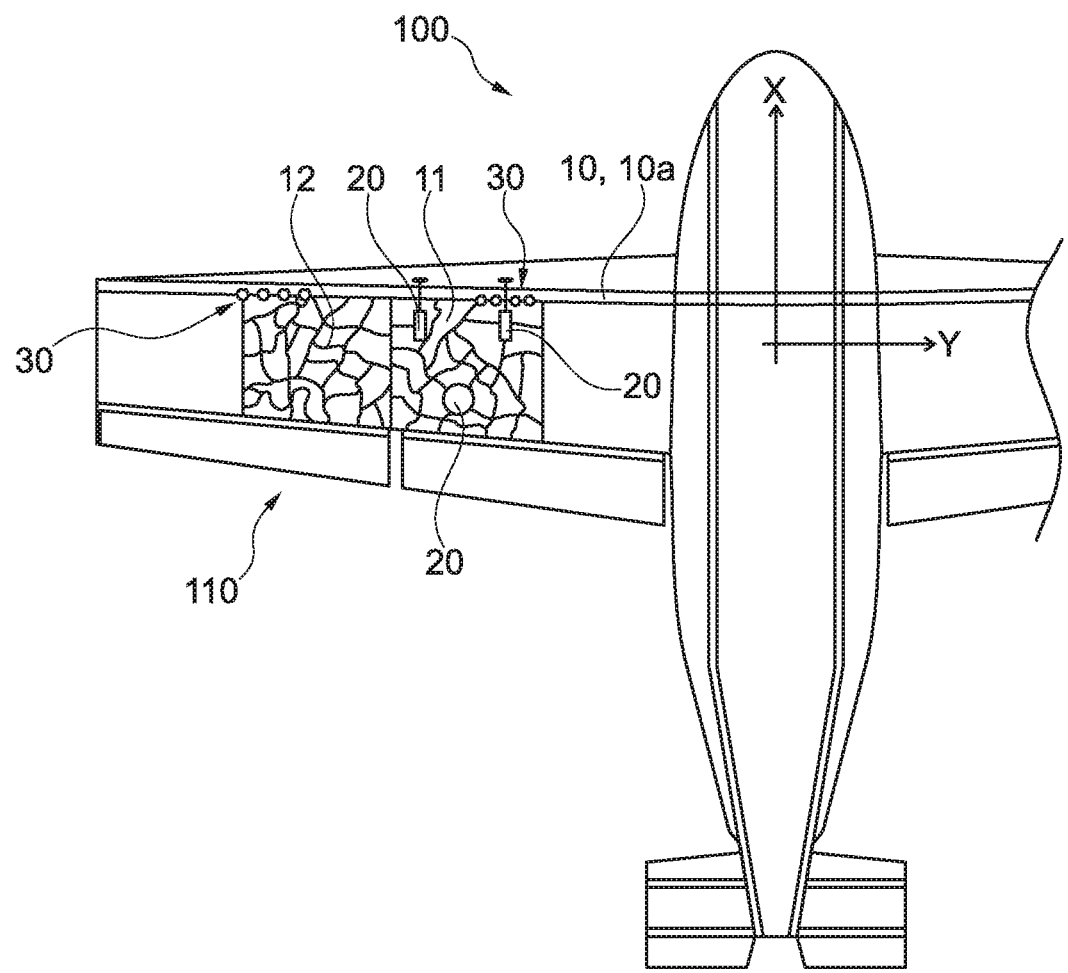
FIG. 1A shows an aircraft having monolithic structural components of a wing structure according to one illustrative embodiment of the invention.

FIG. 1A shows an aircraft 100 having monolithic structural components 11, 12 of a wing structure 110 of the aircraft 100. The aircraft 100 has a primary structural element 10, which extends along the main axis y of the aircraft 100. In particular, the primary structural element 10 is a spar 10a of the wing structure 110 of the aircraft 100. Here, the main axis y is a transverse axis of the aircraft 100, which extends perpendicularly to a keel beam (not illustrated in FIG. 1A) of the aircraft 100 extending along the longitudinal axis x.

The monolithic structural components 11, 12 are produced by means of a three-dimensional printing method. The two monolithic structural components 11, 12 are fixed on the spar 10a in order in this way to form at least one part of the wing structure 110. For better understanding, the monolithic structural components 11, 12 are illustrated in section. Here, the network structure illustrated in FIG. 1A indicates the monolithic structural components 11, 12, which are arranged adjacent to one another as separate components. They can be fixed to one another by fixing elements (not shown). Further adjacent monolithic structural components in the wing structure 110 are possible.

Furthermore, aircraft systems 20 for carrying out aircraft-specific functions are provided in the aircraft 100. In the case illustrated in FIG. 1A, a fuel nozzle or a fuel quantity indicator and control systems or actuators for controlling the leading edge flaps of the aircraft 100 are provided as aircraft systems 20. It is clearly evident here in FIG. 1A that the aircraft systems 20 are accommodated in monolithic structural component 11, in particular being embedded therein. In this case, the aircraft systems 20 are at least partially surrounded by the monolithic structural component 11. In a similar way, a further aircraft system 20 (not shown) can be embedded in the adjacent monolithic structural component 12.

Monolithic structural component 11 and monolithic structural component 12 are fixed on the primary structural element 10 by fixing elements 30, for which purpose material joints, positive joints, nonpositive joints or combinations thereof may be considered.

As is likewise evident in FIG. 1A, the different monolithic structural components 11, 12 have different shapes. In particular, the configuration of the monolithic structural components 11, 12 is dependent on the installation point or installation location on the aircraft 100. Thus, the monolithic structural components 11, 12 configured as a wing profile become shorter towards the ends of the wing, starting from the root of the wing, in relation to the x direction. It is possible for cavities for fuel storage to be provided within the monolithic structural components 11, 12.

Figure 1B:
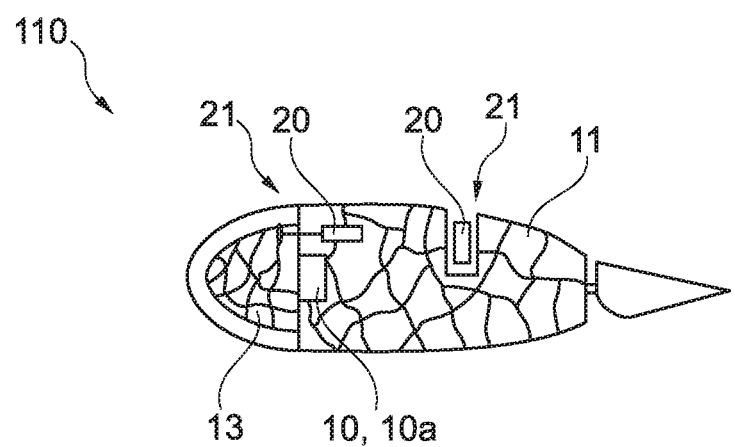
FIG. 1B shows a section through a monolithic structural component of a wing structure according to one illustrative embodiment of the invention.

FIG. 1B shows a section through the monolithic structural component 11 of the wing structure 110 from FIG. 1A. Here, the wing profile is formed substantially by the two monolithic structural components 11, 13, which impart the necessary strength to the wing structure 110. Monolithic structural component 13 is not illustrated in FIG. 1A. The actuators as the aircraft system 20 and leading edge flaps are provided on the monolithic structural components 11, 13. It can be seen that a further aircraft system 20, namely the fuel nozzle on the surface of the aerodynamic wing profile, is provided. Here, a receptacle 21 in the form of an opening in monolithic structural component 11, into which the fuel nozzle is embedded as an aircraft system 20, is provided.

Furthermore, a cross section of the primary structural element 10, in particular of the spar 10a, on which the monolithic structural components 11, 13 are fixed, can be seen.

Figure 2A:
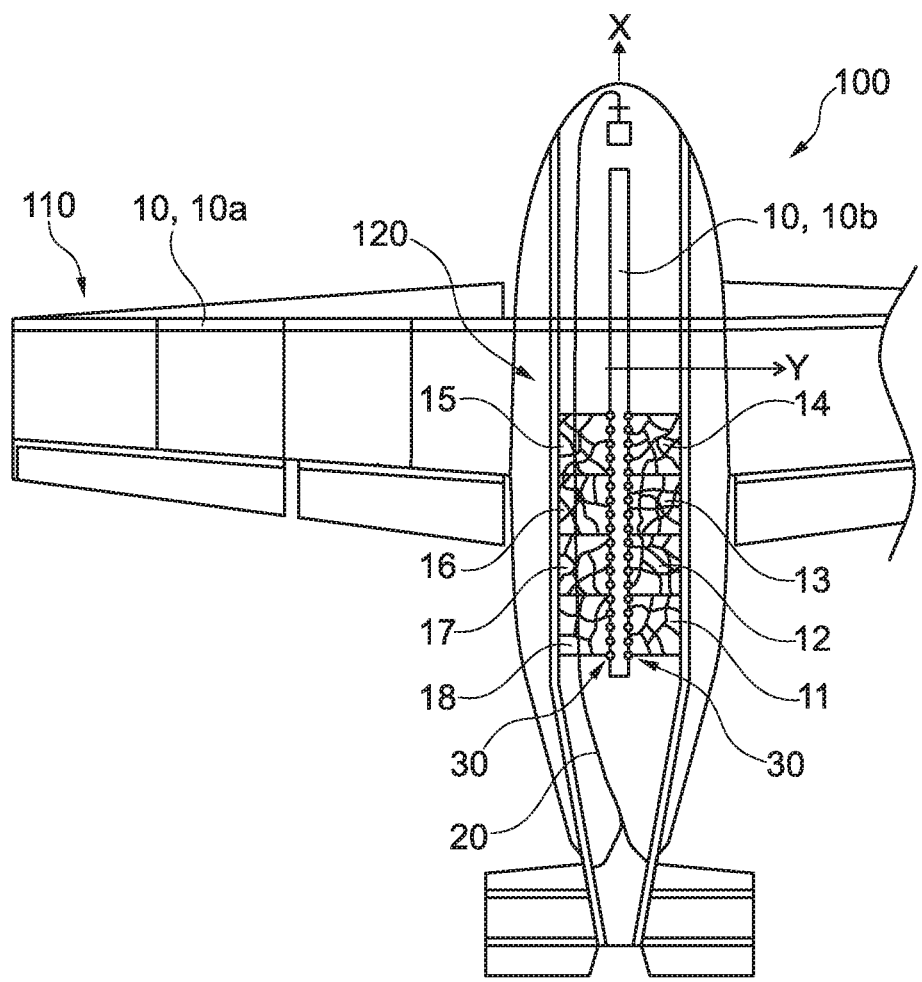
FIG. 2A shows an aircraft having monolithic structural components of a fuselage structure according to one illustrative embodiment of the invention.

FIG. 2A shows an aircraft 100 having a multiplicity of monolithic structural components 11, 12, 13, 14, 15, 16, 17, 18 of a fuselage structure 120 of the aircraft 100. The aircraft 100 has a primary structural element 10, which extends along the main axis x of the aircraft 100. In particular, the primary structural element 10 is a keel beam 10b of the fuselage structure 120 of the aircraft 100. Here, the main axis x is a longitudinal axis of the aircraft 100, which extends perpendicularly to the spar 10a of the wing structure 110 of the aircraft 100. It is possible, in particular, for the features of the wing structure 110 in FIG. 1A to be combined with those of the fuselage structure 120 in FIG. 2A.

The monolithic structural components 11, 12, 13, 14, 15, 16, 17, 18 are produced by means of a three-dimensional printing method. The monolithic structural components 11, 12, 13, 14, 15, 16, 17, 18 are fixed on the keel beam 10b in order in this way to form at least one part of the fuselage structure 120. For better understanding, the monolithic structural components 11, 12, 13, 14, 15, 16, 17, 18 are illustrated in section. Here, the network structure illustrated in FIG. 2A indicates the monolithic structural components 11, 12, 13, 14, 15, 16, 17, 18, which are arranged adjacent to one another as separate components. They can be fixed to one another and to the primary structural element by fixing elements (not shown).

Furthermore, an aircraft system 20 for carrying out an aircraft-specific function is provided in the aircraft 100. In the case illustrated in FIG. 2A, a control cable, an electric lead or a hydraulic line for controlling the elevators of the aircraft 100 are provided as the aircraft system 20. It is clearly evident here in FIG. 2A that the aircraft system 20 is accommodated in the multiplicity of monolithic structural components 11, 12, 13, 14, 15, 16, 17, 18 in particular being embedded therein. In this case, the aircraft system 20 is at least partially surrounded by the monolithic structural components 11, 12, 13, 14, 15, 16, 17, 18.

The monolithic structural components 11, 12, 13, 14, 15, 16, 17, 18 are fixed on the primary structural element 10, that is to say on the keel beam 10b, by fixing elements 30, for which purpose material joints, positive joints, nonpositive joints or combinations thereof may be considered.

The configuration or shape of the monolithic structural components 11, 12, 13, 14, 15, 16, 17, 18 can be dependent on the installation point or installation location in the fuselage of the aircraft 100.

Figure 2B:
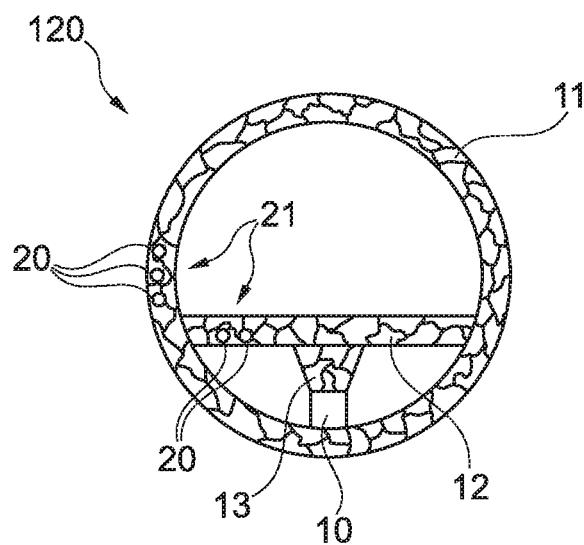
FIG. 2B shows a section through a monolithic structural component of a fuselage structure according to one illustrative embodiment of the invention.

FIG. 2B shows a section through a monolithic structural component 11, 12, 13, 14, 15, 16, 17, 18 of a fuselage structure 120. In this arrangement, a first monolithic structural component 11 forms the outer skin of the fuselage and the supporting structure required for the structural strength of the outer skin of the fuselage. An aircraft system 20 in the form of a line, in particular a hydraulic line, an electric lead, a data line, an oxygen line or a control cable is embedded in the first monolithic structural component 11. The cross-sectional view from FIG. 2B furthermore shows a second monolithic structural component 12, which forms a floor panel of the fuselage structure 120 of the aircraft 100. Corresponding lines are also embedded in monolithic structural component 12. The second monolithic structural component 12 is fixed on the primary structural element 10, that is to say on the keel beam 10b, via a third monolithic structural component 13. Thus, indirect fixing of a monolithic structural component 12 on the primary structural element 10 is also possible, e.g. via another monolithic structural component 13. In any case, the first monolithic structural component 11 is fixed directly on the primary structural element 10 by at least one fixing element 30 (not shown).

Figure 3:
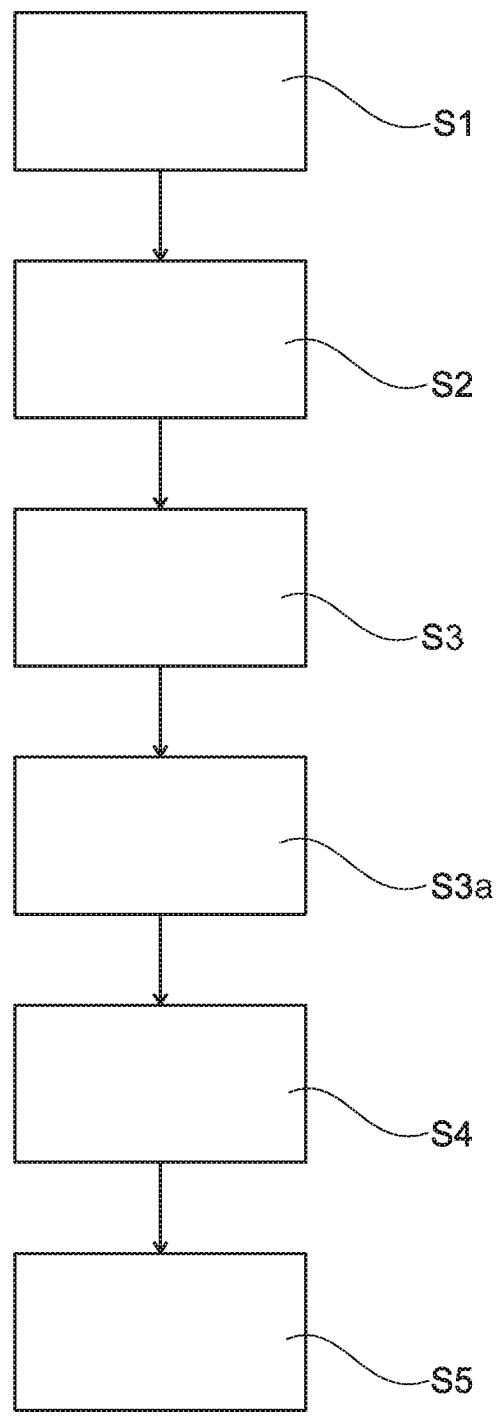
FIG. 3 shows a flow diagram of a method for producing an aircraft according to one illustrative embodiment of the invention.

FIG. 3 shows a flow diagram of a method for producing an aircraft according to one illustrative embodiment of the invention. In a step S1 of the method, an elongate primary structural element 10 extending along a main axis x, y of the aircraft 100 is provided. In a further step S2, three-dimensional printing of at least one monolithic structural component 11 is carried out. In a further step S3, an aircraft system 20 for carrying out an aircraft-specific function is provided. In a further step S4, the at least one monolithic structural component 11 is fixed on the primary structural element 10. In a further step S5, the aircraft system 20 is integrated into a receiving region 21 of the at least one monolithic structural component 11. The steps can be carried out in the sequence described.

In a further step S3a, which can be carried out simultaneously with steps S2 and S3, the aircraft system 20 is integrated into the receiving region 21 of the at least one monolithic structural component 11 during the three-dimensional printing of the monolithic structural component 11. This enables the aircraft system 20 to be embedded directly into the monolithic structural component 11 during the 3-D printing process.

As a supplementary point, it may be pointed out that "comprising" does not exclude any other elements or steps and "a" or "an" does not exclude a multiplicity. Furthermore, it should be noted that features or steps which have been described with reference to one of the above illustrative embodiments can also be used in combination with other features or steps of other illustrative embodiments described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:
1. An aircraft comprising:
a primary structural element extending along a main axis of the aircraft;
a monolithic structural component, which is produced by a three-dimensional printing method, the monolithic structural component comprising a porous structure and forming an outer skin region of the aircraft; and an aircraft system for carrying out an aircraft-specific function, the aircraft system comprising an electric lead, a hydraulic line, a control cable, a control unit, and a tank;

wherein the monolithic structural component is fixed on the primary structural element; and wherein the monolithic structural component accommodates the aircraft system.

2. The aircraft according to claim 1, comprising:

a plurality of additional monolithic structural components;

wherein each monolithic structural component of the plurality of additional monolithic structural components is produced by a three-dimensional printing method;

wherein the monolithic structural components are fixed on the primary structural element adjacent to one another along the main axis of the aircraft to form a basic structure of the aircraft.

3. The aircraft according to claim 1, wherein the porous structure comprises a plurality of cells or cavities that are internal to the monolithic structural component and the outer skin region of the aircraft comprises an aerodynamically smooth outer surface.

4. The aircraft according to claim 1, wherein the primary structural element comprises a spar of a wing structure of the aircraft.

5. The aircraft according to claim 1, wherein the primary structural element comprises a keel beam of a fuselage structure of the aircraft.

6. The aircraft according to claim 1, wherein:

the primary structural element comprises a spar of a wing structure of the aircraft; and the primary structural element comprises a keel beam of a fuselage structure of the aircraft.

7. The aircraft according to claim 1, wherein the aircraft system is embedded in the monolithic structural component.

8. The aircraft according to claim 1, wherein the monolithic structural component is fixed on the primary structural element with a force-fit joint, a form-fit joint, or a material joint.

9. The aircraft according to claim 1, wherein the monolithic structural component is produced from a metallic alloy.

10. The aircraft according to claim 9, wherein composition of the metallic alloy of the monolithic structural component changes along the primary structural element.

11. A method for producing an aircraft, the method comprising:

providing an elongate primary structural element extending along a main axis of the aircraft;

three-dimensionally printing at least one monolithic structural component, which comprises a porous structure and forms an outer skin region of the aircraft;

providing an aircraft system for carrying out an aircraft-specific function, the aircraft system comprising an electric lead, a hydraulic line, a control cable, a control unit, and a tank;

fixing the at least one monolithic structural component on the primary structural element; and integrating the aircraft system into a receiving region of the at least one monolithic structural component.

12. The method according to claim 11, comprising:

integrating the aircraft system into the receiving region of the at least one monolithic structural component during three-dimensional printing of the at least one monolithic structural component.

13. The method according to claim 11, comprising:

providing a plurality of additional monolithic structural components, wherein each monolithic structural component of the plurality of additional monolithic structural components is produced by a three-dimensional printing method; and fixing the monolithic structural components on the primary structural element adjacent to one another along the main axis of the aircraft to form a basic structure of the aircraft.

14. The method according to claim 11, wherein the porous structure comprises a plurality of cells or cavities that are internal to the monolithic structural component and the outer skin region of the aircraft comprises an aerodynamically smooth outer surface.

15. The method according to claim 11, wherein the primary structural element comprises a spar of a wing structure of the aircraft and/or a keel beam of a fuselage structure of the aircraft.

16. The method according to claim 11, wherein the aircraft system is embedded in the monolithic structural component.

17. The method according to claim 11, wherein the fixing of the monolithic structural component on the primary structural element is performed with a force-fit joint, a form-fit joint, or a material joint.

18. The method according to claim 11, wherein the monolithic structural component is produced from a metallic alloy.

19. The method according to claim 18, wherein composition of the metallic alloy of the monolithic structural component changes along the primary structural element.

* * * * *